United States Patent [19]
Onneweer

[11] Patent Number: 5,626,256
[45] Date of Patent: May 6, 1997

[54] BOWL FOR HAND MIXING

[75] Inventor: Frederik J. Onneweer, Tervuren, Belgium

[73] Assignee: Dart Industries Inc., Orlando, Fla.

[21] Appl. No.: 506,842

[22] Filed: Aug. 22, 1995

[51] Int. Cl.$^6$ .................. A47J 47/01; B65D 1/42
[52] U.S. Cl. .............. 220/574; 220/657; 220/659; D7/376; D7/543
[58] Field of Search ............... 220/574, 574.1, 220/659, 657; 206/515; D7/376, 543, 587; 4/450, 452

[56] References Cited

U.S. PATENT DOCUMENTS

| | | | |
|---|---|---|---|
| D. 166,934 | 6/1952 | Slobodkin | D7/543 |
| D. 167,166 | 7/1952 | Rodier | |
| D. 180,329 | 5/1957 | Highberger | |
| D. 184,875 | 4/1959 | Johnson | D7/543 |
| D. 235,302 | 6/1975 | Lanigan et al. | 220/574 X |
| D. 247,737 | 4/1978 | Alexander et al. | |
| D. 259,011 | 4/1981 | Daenen | |
| D. 270,323 | 8/1983 | Powers | |
| D. 272,225 | 1/1984 | De Coster | |
| D. 285,515 | 9/1986 | Papciak | |
| D. 287,324 | 12/1986 | Schmidt | |
| D. 307,395 | 4/1990 | Borst | |
| 1,169,101 | 1/1916 | Hogan | 4/450 |
| 1,575,597 | 3/1926 | Bothe | 220/574 |
| 2,739,464 | 3/1956 | Smith | |
| 2,909,172 | 10/1959 | Caniglia | |
| 3,190,486 | 6/1965 | Rech | 220/574 |
| 4,368,548 | 1/1983 | Glass | 4/450 X |
| 5,203,836 | 4/1993 | Brazis et al. | 220/659 X |
| 5,392,948 | 2/1995 | McEntee | 220/657 X |

OTHER PUBLICATIONS

Industrial Design (Jul./Aug., 1987) p. 97.

Primary Examiner—Allan N. Shoap
Assistant Examiner—Niki M. Kopsidas
Attorney, Agent, or Firm—John A. Doninger

[57] ABSTRACT

A mixing bowl of generally ellipsoidal configuration having an elliptical upwardly domed base, upwardly and outwardly arcing side wall, and an upper ellipse-defining rim. The rim is surrounded by an outwardly and downwardly inclined flange varying in width from one end of the rim whereat a pour spout is defined to a maximum width at the other end of the rim whereat a gripping and nesting recess is defined.

7 Claims, 2 Drawing Sheets

BOWL FOR HAND MIXING

BACKGROUND OF THE INVENTION

Mixing bowls, that is bowls for the mixing and blending of foodstuffs, are, conventionally, round or circular in cross-section. This has historically been the case for a variety of reasons, including the ease of forming such bowls of ceramic and glass, the primary materials for such bowls prior to the use of food compatible synthetic resins. In addition, the circular bowl is particularly adapted for use in automated equipment, such as stand-mounted electric mixers wherein the bowl is positioned off center to the mixing blades and rotates in conjunction with the mixing action of the blades.

However, such circular or generally hemispherical bowls are less than completely satisfactory when the contents are to be hand mixed, that is mixed by a hand held implement which is manipulated about the interior of the bowl. The main problem with hand mixing in a circular bowl is that the hand and arm tend to naturally follow a generally elliptical path in a normal stirring motion, not a circular path as would be required by a circular mixing bowl for maximum effectiveness. As such, a substantial degree of control must be maintained by the one doing the stirring to ensure that the stirring implement properly engages all of the contents of the bowl. The natural tendency of the hand to move in an elliptical path must either be physically controlled by the user or restrained by the confines of the bowl wall.

SUMMARY OF THE INVENTION

The present invention is concerned with a mixing bowl particularly adapted for hand mixing, that is a mixing bowl wherein the mixing implement, whether a whisk, spoon, spatula or the like, is hand held and manipulated within the bowl and the foodstuff therein.

A particular object of the invention is to provide a bowl wherein the natural tendency for the hand to move in an elliptical path is accommodated. Thus, the contents of the bowl are more effectively mixed and, equally important, the actual mixing effort on the part of the user is reduced in that only a natural hand movement is required. Incidentally, it should be appreciated that while reference is made to hand movement, the movement actually involves the wrist, arm, elbow and shoulder in varying degrees.

In achieving a practical and improved bowl for hand mixing, it is also an object of the invention to provide, as an integral part of the bowl, a handle portion allowing for a tipping or guiding of the positioning of the bowl while allowing for the continued elliptical mixing movement. Other features of the bowl, which particularly adapt the bowl for effective use in hand mixing, include the provision of a pouring spout opposite from the handle portion, and the provision of a retaining recess associated with the handle, whereby the mixing implement itself can be held within the bowl, opposite from the pouring spout, by a thumb or finger of the user as the handle is raised for pouring. As such, the normally food-laden implement need not be removed from the bowl as the contents of the bowl, along with any drippage from the implement, are discharged.

The bowl itself is of an elliptical configuration which, overall, might be considered approximately one-half of an ellipsoid. The base of the bowl is elliptical and, for the entire extent thereof, upwardly domed from its peripheral edge. The bowl wall, integral with the peripheral edge of the base, arcs upwardly and outwardly with smooth exterior and interior surfaces for the full height of the peripheral wall. In other words, there are no horizontal or vertical interruptions, particularly on the interior surface of the bowl, as might interfere with the smooth movement of the mixing implement and/or foodstuff about the bowl interior.

The upper edge or rim of the wall defines an elliptical configuration when viewed in plan, and tapers along the elliptical length of the bowl from a minimum height at the pouring spout end of the bowl to a maximum height at the handle end of the bowl along a slight arcuate path as best seen in the longitudinal cross-section of FIG. 3.

The upper rim of the bowl is surrounded by an integral flange which flares or tapers outwardly and downwardly from the rim completely thereabout. This flange varies relatively constantly in width from the narrowest width at the pour spout end to a maximum width at the handle end. The pour spout is defined by a recess formed in the flange and adjoining rim portion of the wall. At the handle end of the bowl, a similar although substantially enlarged recess is defined at the rim portion of the bowl and adjoining portion of the flange. The enlarged recess forms a rest or seat for the handle of a hand implement for retention thereof in a fixed position. During a pouring of the bowl contents, the thumb of the hand holding the bowl handle can also retain the implement handle within the bowl. In this manner, the implement, with the clinging foodstuff, need not be removed and separately held as the contents of the bowl are being discharged through the pouring spout.

Other features and advantages of the invention will be appreciated from the more detailed description of the invention following hereinafter.

DESCRIPTION OF PREFERRED EMBODIMENT

The mixing bowl 10 of the invention is of a generally ellipsoidal configuration, or more particularly one-half of an ellipsoidal shape.

The base 12 of the bowl is elliptical or substantially elliptical, that is having an elliptical periphery. The base is also slightly upwardly domed, in its entirety, inwardly toward the interior of the bowl 10.

Figure 3:
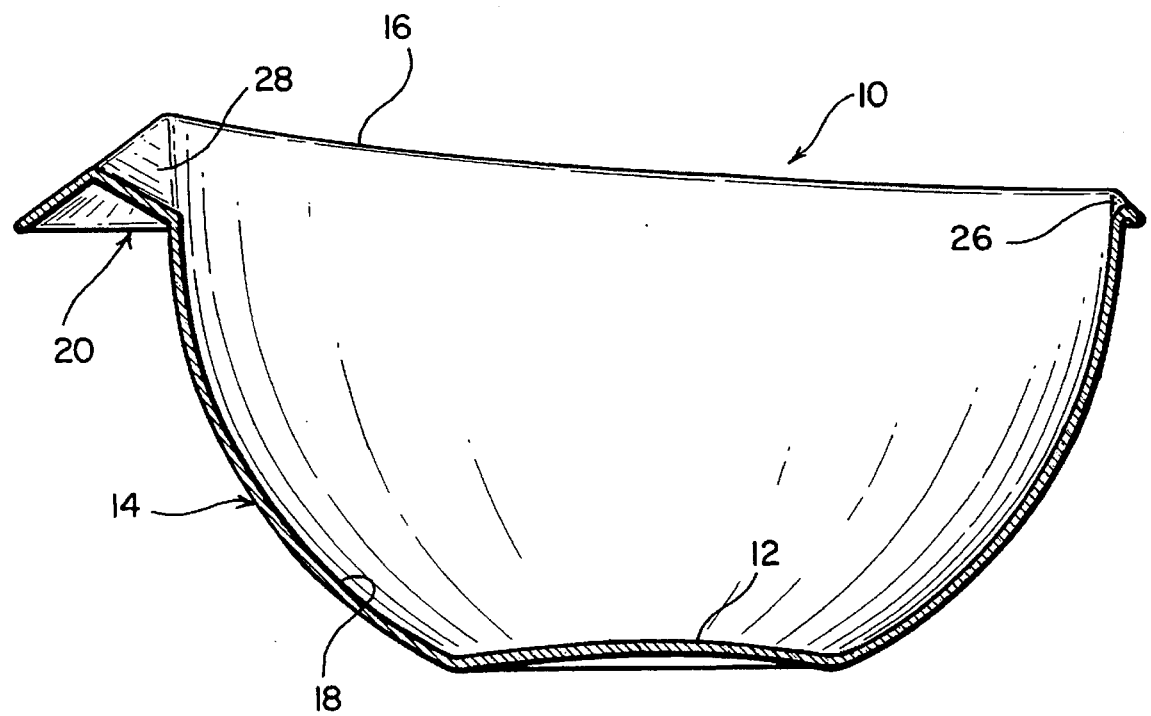
FIG. 3 is a cross-sectional view on line 3—3 in FIG. 2, along the longitudinal axis of the bowl and through both the pouring spout and the handle.
Figure 4:
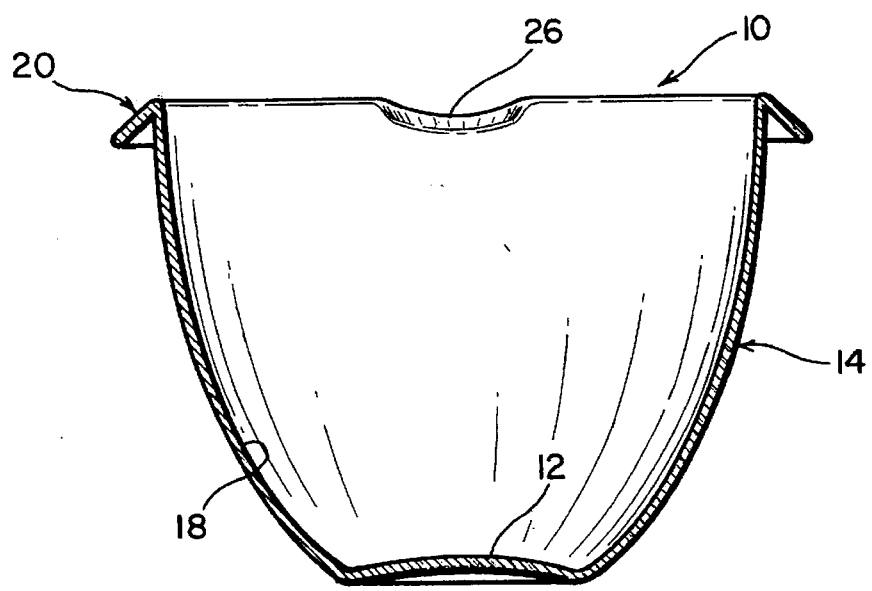
FIG. 4 is a transverse cross-sectional view on line 4—4 in FIG. 2.

The peripheral wall 14 of the bowl is integral with the peripheral edge of the base 12 and smoothly arcs upwardly and outwardly therefrom to terminate in a substantially vertically upwardly directed rim 16. The rim 16, in plan, defines an elliptical configuration centered over the elliptical base 12 and is substantially enlarged relative thereto. So centered, the longitudinal and transverse axes of the shape defined by the rim 16 align over the longitudinal and transverse axes respectively of the base 12. Noting FIG. 3 in particular, it will be seen that the rim 16 inclines slightly from one longitudinal end of the bowl 10 to the other longitudinal end along a very slight arcuate path. Thus, the height of the peripheral wall 14 will vary from a minimum height at the pouring end portion of the bowl to a maximum height at the opposed handle end portion of the bowl, gradually varying in height between the ends.

The wall 14 has a smooth exterior surface, and more importantly a smooth and uninterrupted interior surface 18 so as to avoid any restriction to the free movement of the mixing implement and foodstuff either vertically or circumferentially about the interior of the bowl.

The bowl 10, integral with the upper rim 16 thereof, includes a peripheral outwardly and downwardly flaring edge flange 20 completely thereabout. This edge flange 20 is of a substantially constantly varying width from a minimum width at the lower end portion of the bowl, as at 22, to a maximum width at the higher end portion of the bowl, as at 24.

In order to provide for a pouring of the contents from the mixing bowl 10, a pouring spout 26 is formed in the bowl at the lower pouring end thereof. The spout 26 is defined by an arcuate recess or depression within the upper rim area of the bowl wall 14 and the adjoining minimum width flange portion 22 at the low end of the bowl. Thus, upon a tipping of the bowl toward the low end, the foodstuff, through the converging wall portions, will move toward the longitudinal center line of the bowl and through the spout for relatively concentrated discharge. It would be appreciated that the elongate converging nature of the longitudinal sides of the bowl will encourage a proper collecting and discharge of the foodstuff.

At the opposite longitudinal end of the bowl 10, a combination grasping recess, for the hand, and implement seat 28 is provided. The recess 28 is defined in the rim portion of the bowl wall 14 and the adjoining portion of the widest area 24 of the flange 20, and is substantially greater in width, length and depth than the pouring spout recess 26.

The flange portion 24, in cooperation with the recess 28, forms an enlarged and comfortable handle, usually grasped with the user's thumb seated within the recess 28. The palm of the grasping hand will normally overly the flange portion 24 immediately outward of the recess 28, and the remaining fingers of the hand will curl under the depending lip-like configuration formed by the flange 20. Held in this manner, the bowl 20 can be raised toward the lower pour end and, as desired, tipped toward either side should this be necessary in facilitating the mixing or stirring of the contents. As the width of the handle gradually tapers toward and along the opposed sides of the bowl rim 16, should it be necessary, the grasping or gripping hand can actually be moved slightly to the opposed sides of the recess 28 while still maintaining a firm grip on the bowl.

The recess 28 performs an additional significant function in accommodating the stirring implement, generally designated as a spoon in the drawings, when contents are being added to the bowl or dispensed therefrom, without the necessity of removing the normally laden implement from the bowl, and having the attendant problem of finding a place to put the implement. Basically, the handle of the implement will be merely nested in the recess 28 with the mixing portion of the implement remaining in the bowl, possibly resting on the bottom thereof. Should it be necessary, as during pouring, the implement can actually be retained by the thumb of the hand gripping the handle portion of the flange 20.

Figure 1:
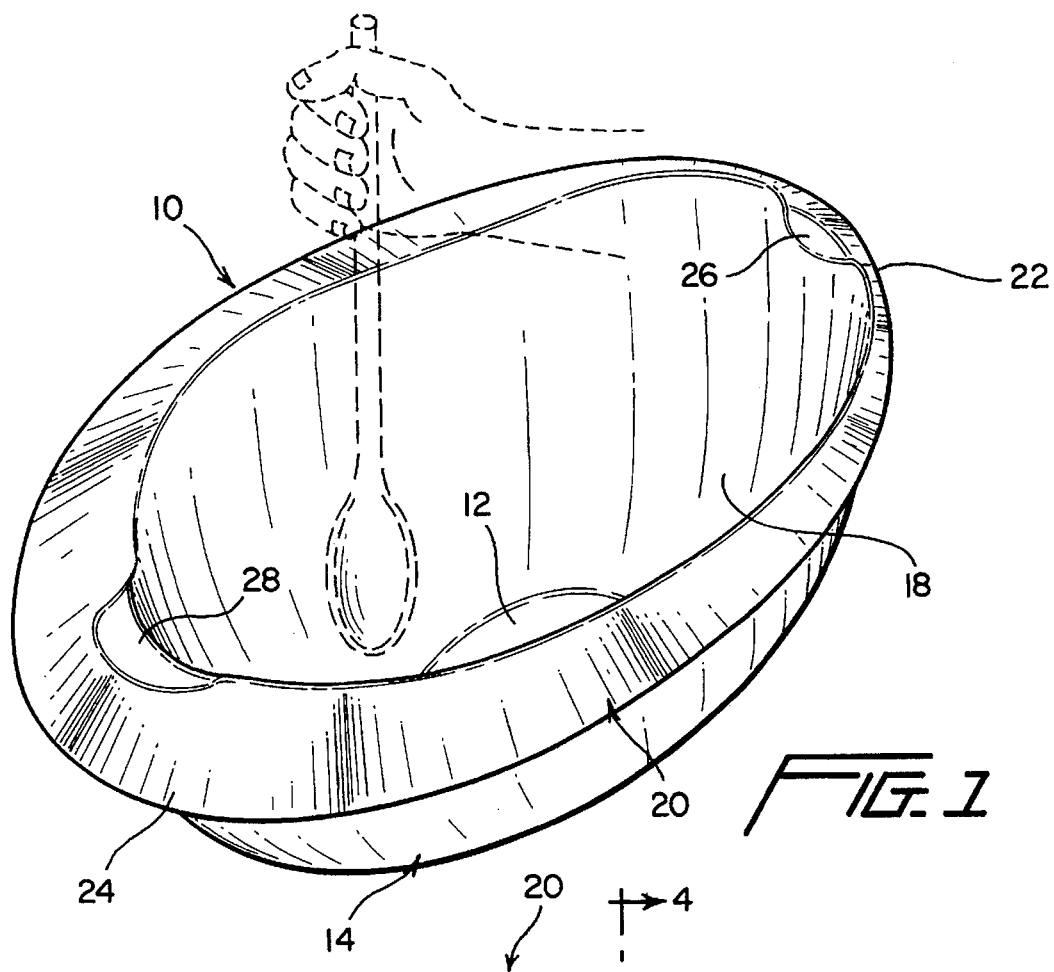
FIG. 1 is a top perspective view of the mixing bowl of the invention.
Figure 2:
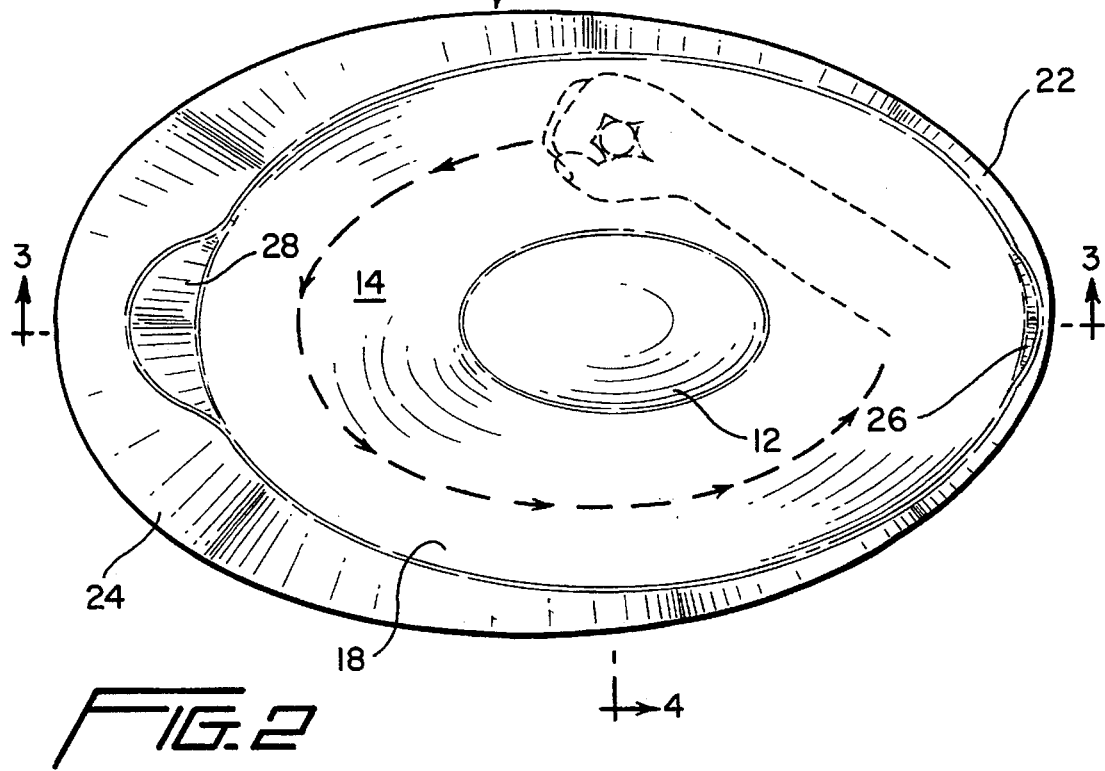
FIG. 2 is a top plan view of the mixing bowl with the natural path of a hand held implement suggested by the phantom line showing therein and by the direction arrows.

While the interior of the bowl, as defined by the base 12, peripheral wall 14 and wall rim 16 is elliptical or partially ellipsoidal, the outer edge of the outwardly and downwardly inclined flange 20, noting the plan view of FIG. 2, defines more of an oval or ovate configuration, slightly wider at the handle end as compared to the spout end.

As previously noted, the mixing bowl 20 of the invention is uniquely adapted for use with a hand-held stirring implement in that the configuration allows for a natural generally elliptical movement of the hand. It is further enhanced by the oval outwardly and downwardly inclined flange provided thereon and incorporating, at one end, an integral recess defining a pour spout, and at the other end an enlarged recess defining, in conjunction with the widest portion of the flange, both a gripping area and a rest area for the implement.

The elliptical and domed configuration of the base is also significant in ensuring an effective and efficient flow of the stirred material outwardly from the center toward that area of the bowl within which the major elliptical stirring movement of the implement is effected.

The foregoing described embodiment is illustrative of the invention. As variations or related embodiments incorporating the features of the invention may occur to those skilled in the art, it is to be appreciated that the invention is only to be limited by the scope of the claims following hereinafter.

I claim:

1. An upwardly opening bowl for the mixing of foodstuffs with a hand held stirring implement, said bowl having a base, a peripheral wall integral with said base, extending upward therefrom and defining a bowl interior, said wall terminating in an upper rim with a peripheral flange integral therewith and inclining outwardly and downwardly therefrom, said flange having a peripheral outer edge, said base being substantially elliptical, said wall rim defining an elliptical configuration generally centered over said base and substantially greater than said base in both length and width, said peripheral wall being of a partial ellipsoidal configuration and both outwardly and upwardly arcing from said base to said rim, said wall having a smooth and uninterrupted interior surface for the full extent thereof between said base and rim for unrestricted vertical and peripheral travel of a hand held stirring implement thereabout, said bowl having a first end and an opposed second end, and opposed sides extending between said first and second ends, said bowl flange, at said first end, having a first recess of predetermined width and depth defined therein and extending outward from the interior wall surface, said first recess forming a pouring spout, said flange, at said second end, having a second recess defined therein and extending outward from the interior wall surface, said second recess being of a substantially greater width and depth than said first recess, said second recess forming, with the flange, a handle for the bowl and a seat for a stirring implement when the bowl is tipped for pouring said first and second recesses each having a radially outermost portion which is in inwardly spaced relation from said peripheral outer edge and is at a height higher than said peripheral outer edge.

2. The bowl of claim 1 wherein said flange is of a maximum width at said second handle-forming recess and at a substantially lesser minimum width at said pouring spout.

3. The bowl of claim 2 wherein said peripheral outer edge has an ovate configuration, and with said peripheral outer edge defines an arc of predetermined curvature at said first end, and an arc of greater curvature at said end.

4. The bowl of claim 1 wherein said bowl rim is inclined upwardly along an arc from a minimum height above said base at said first end to a greater and maximum height at said second end.

5. An upwardly opening bowl for the mixing of foodstuffs with a hand held stirring implement, said bowl having a base, a peripheral wall integral with said base, extending upward therefrom and defining a bowl interior, said wall terminating in an upper rim with a peripheral flange integral therewith and inclining outwardly and downwardly therefrom, said base being substantially elliptical, said wall rim defining an elliptical configuration generally centered over said base and substantially greater than said base in both length and width, said peripheral wall being of a partial ellipsoidal configuration and both outwardly and upwardly arcing from said base to said rim, said wall having a smooth and uninterrupted interior surface for the full extent thereof between said base and rim for unrestricted vertical and peripheral travel of a hand held stirring implement thereabout, said base, in its entirety, having a smooth and uninterrupted interior surface upwardly arcuately domed into said bowl interior wherein flow of stirred foodstuff is encouraged, said bowl having a first end and an opposed second end, and opposed sides extending between said first and second ends, said bowl flange, at said first end, having a first recess of predetermined width and depth defined therein and extending outward from the interior wall surface, said first recess forming a pouring spout, said flange, at said second end, having a second recess defined therein and extending outward from the interior wall surface, said second recess being of a substantially greater width and depth than said first recess, said second recess forming, with the flange, a handle for the bowl and a seat for a stirring implement when the bowl is tipped for pouring, said flange being of a maximum width at said second handle-forming recess and at a substantially lesser minimum width at said pouring spout, said flange being of a continuously varying width from said second end toward said first end along and for at least a major portion of each of said sides, said bowl rim being inclined upwardly along an arc from a minimum height above said base at said first end to a greater and maximum height at said second end.

6. The bowl of claim 5 wherein said flange has a peripheral outer edge of an ovate configuration.

7. The bowl of claim 6 wherein said first and second recesses each terminate inward of said flange outer edge.

* * * * *